US006988078B1

(12) United States Patent
Heidenreich et al.

(10) Patent No.: US 6,988,078 B1
(45) Date of Patent: Jan. 17, 2006

(54) CONTROL SYSTEM AND METHOD FOR CURRENCY EXCHANGE AND MERCHANDISE SALES

(75) Inventors: Sharon K. Heidenreich, Highlands Ranch, CO (US); Anthony J. Selway, Mesa, AZ (US); Woodrow Hendricks Danda, Vancouver (CA); Daniel J. Ebert, Littleton, CO (US); Gael Ellen Jose, Pinecrest, FL (US); Jeff D. Shafer, Highlands Ranch, CO (US); Robert F. Drab, Denver, CO (US)

(73) Assignee: First Data Corporation, Englewood, CO (US)

( * ) Notice: Subject to any disclaimer, the term of this patent is extended or adjusted under 35 U.S.C. 154(b) by 468 days.

(21) Appl. No.: 09/653,498

(22) Filed: Aug. 31, 2000

(51) Int. Cl.
*G06F 17/60* (2006.01)

(52) U.S. Cl. .......................... 705/22; 705/18; 235/385; 312/333; 312/330.1; 70/85; 280/47.35

(58) Field of Classification Search ................. 705/16, 705/17, 18, 22; 235/381, 384, 385; 312/333, 312/330.1; 70/85; 280/47.35
See application file for complete search history.

(56) References Cited

U.S. PATENT DOCUMENTS

| | | | |
|---|---|---|---|
| 4,030,788 A | | 6/1977 | Bleeker |
| 4,366,997 A | * | 1/1983 | Lopez et al. ................. 312/204 |
| 4,401,350 A | | 8/1983 | Fortune |
| 4,886,286 A | * | 12/1989 | Whorton, III ............ 280/47.35 |
| 4,913,341 A | * | 4/1990 | Bachman ................... 232/1 D |
| 5,055,660 A | * | 10/1991 | Bertagna et al. ....... 235/472.02 |
| 5,057,677 A | * | 10/1991 | Bertagna et al. ............ 235/380 |
| 5,129,501 A | | 7/1992 | Halsey et al. |
| 5,306,028 A | * | 4/1994 | Pike et al. ................ 280/47.35 |
| 5,367,452 A | * | 11/1994 | Gallery et al. ................. 705/28 |
| 5,412,193 A | * | 5/1995 | Swartz et al. ................ 235/383 |
| 5,549,375 A | * | 8/1996 | Pagliaccio ............... 312/319.1 |
| 5,716,114 A | | 2/1998 | Holmes et al. |
| 5,758,525 A | | 6/1998 | Goldman |
| 5,805,075 A | | 9/1998 | Carlson et al. |
| 5,873,069 A | * | 2/1999 | Reuhl et al. ................... 705/20 |
| 5,971,274 A | * | 10/1999 | Milchman .................... 235/384 |
| 6,003,008 A | * | 12/1999 | Postrel et al. .................. 705/4 |

(Continued)

FOREIGN PATENT DOCUMENTS

DE            931462            8/1955

(Continued)

OTHER PUBLICATIONS

Indiana Cash Drawer Introduces the 6BT Money Tray!. www.icdpos.com. Press Release on May 21, 2000.*

*Primary Examiner*—James S. McClellan
(74) *Attorney, Agent, or Firm*—Townsend and Townsend and Crew LLP

(57) ABSTRACT

A system for controlling currency exchange and merchandise sales on commercial airline flights includes a point-of-sale (POS) computer for receiving currency and merchandise inventory information preflight and for recording transactions in-flight. Data is exchanged between the POS computer and a cash/currency processing computer (CPC) for reconciling preflight and post-flight inventories and for generating reports for use by the airlines, merchandise vendors and currency exchange service providers. A control method includes the steps of determining currency and merchandise inventories preflight, recording transactions in-flight and reconciling and reporting transactions post-flight.

24 Claims, 23 Drawing Sheets

U.S. PATENT DOCUMENTS 6,027,025 A * 2/2000 Postrel et al. ............... 235/486
6,123,346 A * 9/2000 Baldwin .................. 280/47.35
6,139,034 A * 10/2000 Williams ................. 280/47.35
6,390,366 B1 * 5/2002 Heidenreich et al. ....... 235/384

FOREIGN PATENT DOCUMENTS

FR 1144697 10/1957
JP 8-282499 * 10/1996

* cited by examiner

Main Screen

SERVICE PROVIDER

FIG. 4a

Tool Bar Buttons:

| Button | Function |
|---|---|
| Airlines | When this button is pressed, the user is taken to the Airline Screen where they are able to maintain basic airline information. |
| Flights | When this button is pressed, the user is taken to the Flight Screen where they are able to maintain basic flight schedule information. |
| Currency | When this button is pressed, the user is taken to the Currency Screen where they are able to maintain basic information about the various currencies that are loaded onto the PC card. |
| Rates | When this button is pressed, the user is taken to the Rate Screen where they are able to maintain the current spot rates for each currency that is listed on the Currency Screen. |
| Pricing | When this button is pressed, the user is taken to the Pricing Screen where they are able to maintain the fee amounts and the spread amount SkyTeller applies to currency exchange transactions. This is for each currency that is listed on the Currency Screen. |
| Cash Bag | When this button is pressed, the user is taken to the Cash Bag Screen where they are able to enter the beginning inventory information for each currency being packed for a particular flight. |
| Validate | When this button is pressed, the user is taken to the Validation Screen where they are able to confirm the beginning inventories for each cash bag and currency on a trip. This is also where the data is downloaded to the PC card. |
| Save | Save any pending changes to the database. |
| Exit | Exit the application. |

FIG. 4b

Airlines Screen

| | Airline Information | | | |
|---|---|---|---|---|
| Airlines | Code | Name | Base Currency | Maximum Transaction Amount |
| Flights | AA | American Airlines | USD | 1,000,000,000.00 |
| Currency | BA | British Airways | GBP | 1,000,000,000.00 |
| Rates | CP | Canadian Airlines | CAD | 1,000.00 |
| Pricing | CX | Cathay Pacific | USD | 1,000.00 |
| Cash Bag | DL | Delta Airlines | USD | 10,000.00 |
| Validate | LH | Lufthansa | DEM | 1,000,000,000.00 |
| Save | SIA | Singapore Airlines | ARP | 1,000,000,000.00 |
| Exit | | | | |

*FIG. 5a*

| Field | Purpose |
|---|---|
| Code | A code (maximum of 3 characters) that uniquely identifies the airline. |
| Name | The actual name of the airline (maximum of 20 characters). |
| Base Currency | The primary currency that the airline uses. There is a list of values available containing currencies from the Currency Screen. To select from this list of values press the *F9* key. This field can only contain values from this list. |
| Maximum Transaction Amount | The maximum amount a single transaction can be for this particular airline. |

*FIG. 5b*

Flight Screen

*FIG. 6a*

| Field | Purpose |
|---|---|
| Airline | The code identifying the airline. There is a list of values available containing airlines from the Airline Screen. To select from this list of values press the *F9* key. This field can only contain values from this list. |
| Flight | A code (maximum of 6 characters) that identifies a flight. |
| Origin | The airport code from which the flight departs (maximum of 3 characters). |
| Dest | The airport code to which the flight is traveling (maximum of 3 characters). |

*FIG. 6b*

Currency Screen

FIG. 7a

| Field | Purpose |
|---|---|
| Code | A 3-character code that uniquely identifies each currency. |
| Name | A long name for the currency, typically including the country and name of the currency (maximum of 14 characters). |
| ISO Code | A 3-number code that is an international code that uniquely identifies each currency. |
| Minimum Note | The smallest denomination that SkyTeller will sell in that currency. |
| Travelers Check | A checkbox that is checked if travelers checks in a particular currency are acceptable tender for FX transactions or unchecked if travelers checks are not acceptable. The default is unchecked. |
| European Currency | A checkbox that is checked if this currency is one of the currencies that is part of the new Euro currency base group. This is required as these currencies are supposed to be converted into Euro units before the exchange rate is applied. It is unchecked if this currency is not apart of the Euro. The default is unchecked. |
| Centrally Acquired | A checkbox that is checked if credit card transactions in this currency can be processed in the native currency (without having to be converted to a base currency first). It is unchecked if this currency cannot be processed in the native currency. The default is unchecked. |
| Denominations | A list of the valid denominations for that currency. The TC denomination represents Travelers Checks. Each currency for which traveler's checks are accepted should contain a TC denomination. Coins are represented with a decimal (.01, .05, .10, etc.) |

FIG. 7b

Rates Screen

*(Screenshot of Rates Screen showing User: IFLT2 Date: 07-AUG-2000 - [PC Card Load])*

Rate Information (Spot Rate Per US Dollar)

| Code | Effective Date | Rate |
|------|----------------|------|
| ARP | 20000713 11:26:47 | .9995 |
| ATS | 20000713 11:26:47 | 14.6062 |
| AUD | 20000713 11:26:47 | 1.7003 |
| BEF | 20000713 11:26:47 | 42.5799 |
| BRL | 20000713 11:26:47 | 1.803 |
| CAD | 20000713 11:26:47 | 1.4809 |
| CHF | 20000713 11:26:47 | 1.6266 |
| DEM | 20000713 11:26:47 | 2.0761 |
| DKK | 20000713 11:26:47 | 7.8645 |
| ESP | 20000713 11:26:47 | 175.625 |
| FIM | 20000713 11:26:47 | 6.2759 |
| FRF | 20000713 11:26:47 | 6.9628 |
| GBP | 20000713 11:26:47 | .6638 |
| GRD | 20000713 11:26:47 | 355.4 |
| HKD | 20000713 11:26:47 | 7.7963 |

Load Rates from Rate Transfer File
[Load Rates]

Create New Rate Records via Copy Forward old Rates
[Copy All]

FIG. 8a

| Field | Purpose |
|-------|---------|
| Code | The 3-character code, identifying a specific currency. There is a list of values available containing currencies from the Currency Screen. To select from this list of values press the *F9* key. This field can only contain values from this list. |
| Effective Date | The date and time from which the rate value is valid from. If rate information is not updated for several days, then the most current rate information will be used for downloading to the PC cards. |
| Rate | Numeric field that contains the spot rate expressed in "per-dollar". The rate should be rounded to the 4$^{th}$ decimal place to the right side of the decimal. |
| Load Rates | A button that when pressed will ask the user for a directory of where a rate data file exists. This file should come from a central source in SkyTeller. Once the user enters this directory, the text file is read and saved to the database. The screen will then be populated with the most recent spot rates. |
| Copy All | A button that when pressed will copy the most recent spot rate for each currency and assign them an effective date and time of the current date. The screen will then be populated with the most recent spot rates. |

FIG. 8b

Pricing Screen

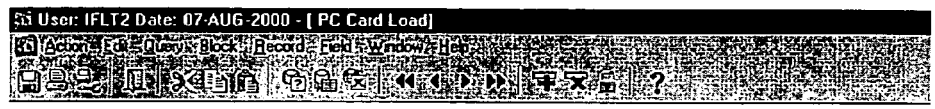

| | | | | | Minimum | Par | Minimum |
|---|---|---|---|---|---|---|---|
| Code | Origin | Dest | Spread % | Fee % | Fee | Fee % | Par Fee |
| ARP | YVR | DEL | 10 | 1.25 | 5 | 0 | 0 |
| ARP | YVR | HKG | 10 | 0 | 0 | 0 | 0 |
| ARP | YVR | NGO | 10 | 0 | 0 | 0 | 0 |
| ARP | YVR | NRT | 10 | 0 | 0 | 0 | 0 |
| ARP | YVR | TPE | 10 | 0 | 0 | 0 | 0 |
| ARP | YVR | YVR | 8 | 0 | 3 | 0 | 0 |
| ATS | YVR | DFL | 6 | 1.5 | 65 | 0 | 0 |
| ATS | YVR | HKG | 8 | 0 | 0 | 0 | 0 |
| ATS | YVR | NGO | 9 | 0 | 0 | 0 | 0 |
| ATS | YVR | NRT | 9 | 0 | 0 | 0 | 0 |
| ATS | YVR | TPE | 7 | 0 | 0 | 0 | 0 |
| AUD | YVR | DFL | 6 | 1.5 | 5 | 0 | 0 |
| AUD | YVR | HKG | 6 | 0 | 0 | 0 | 0 |
| AUD | YVR | NGO | 9 | 0 | 0 | 0 | 0 |
| AUD | YVR | NRT | 9 | 0 | 0 | 0 | 0 |

*FIG. 9a*

| Field | Purpose |
|---|---|
| Code | The 3-character code that identifies the currency. There is a list of values available containing currencies from the Currency Screen. To select from this list of values press the F9 key. This field can only contain values from this list. |
| Origin | The airport code from which the flight departs (maximum of 3 characters). |
| Dest | The airport code to which the flight is traveling (maximum of 3 characters). This can also be the default value "DFL". |
| Spread % | This value is the percentage amount applied to the spot rates between 0 and 100%. |
| Fee % | This value is a fee paid by the customer to SkyTeller to perform a currency exchange. This is a percentage value of the currency amount tendered between 0 and 100%. |
| Minimum Fee | This value is the minimum fee (not a percentage) that will be charged for performing a currency exchange if the transaction amount isn't greater than or equal to the minimum note. |
| Par Fee % | This value is a fee paid by the customer to SkyTeller to perform a par currency exchange. This is a percentage value of the currency amount tendered between 0 and 100%. |
| Minimum Par Fee | This value is the minimum fee (not a percentage) that will be charged for performing a par currency exchange if the transaction amount isn't greater than or equal to the minimum note. |

*FIG. 9b*

Cash Bag Screen

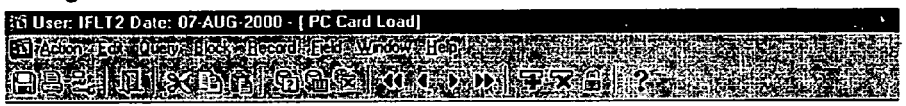

FIG. 10a

| Field | Purpose |
|---|---|
| Flight | This field is a menu list of the flights that are being serviced by SkyTeller. |
| Flight Date | This is the date on which the flight will depart from the originating airport. |
| Cash Bag Serial Number | The serial number of the cash bag whose inventory is being loaded. This should be a unique number for this flight |
| Currency Code | The 3-character code to identify the currency. This field is a menu list of the currencies that are in the Currency screen and that haven't already been selected for this flight. Crew currencies should NOT be selected. |
| Start Total | The face value amount of the currency loaded into the cash bag. This is the beginning inventory amount that this currency will start off with on the flight. |
| Currency to Sell | A checkbox that when checked indicates that the current currency is going to be sold on this particular flight from this particular cash bag. If unchecked, then the currency will be used for change on this particular flight from this particular cash bag. The default is checked. |
| Next Bag | A button that when pressed allows the user to enter data for an additional cash bag on a selected flight. |
| Next Flight | A button that when pressed allows the user to enter data for an additional flight on the current PC Card. |
| Validate Data | A button that when pressed takes the user to the Validation Screen so all the data just entered can be reviewed. This should be done only after all information for a given PC Card has been entered. |
| Reset | A button that when pressed removes all the entered cash bag information and allows the user to start over from the beginning. |

FIG. 10b

Validate Screen

| Bag ID | Serial number of the cash bag to be loaded. This can be modified or changed. |
|---|---|
| Currency | 3-character code identifying the currency that was loaded. This can be modified or changed. |
| Currency to Sell | A checkbox if checked indicates this currency is to be sold on this flight otherwise if unchecked it is to be used for change. This can be changed. |
| Total | The total face amount of notes in the selected currency (beginning inventory). This can be modified or changed. |
| Select Drive for PC Card Reader | Select the letter of the drive to which the PC Card reader is attached. This field is a menu list of all drives that may be available on this PC. |
| Run Bart Report | A button that when pressed runs the Bart Report that is to be given to the flight attendants for announcements of the FX service. (See Reports section for more detail on the Bart Report.) |
| Transfer to PC Card | A button that when pressed initiates the transfer of data to the PC Card. |
| Reset | A button that when pressed removes all entered cash bag information to allow the user to start over at the Cash Bag Screen. |

PC Card

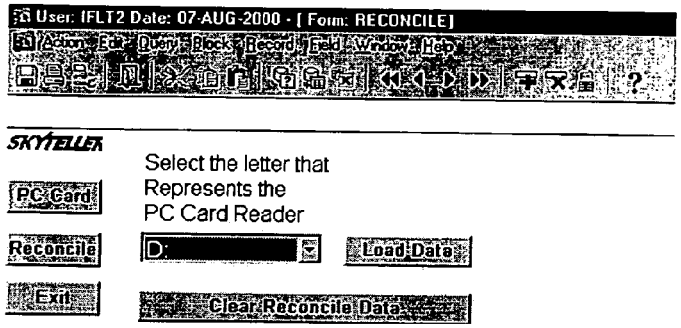

FIG. 12a

| Fields | Purpose |
|---|---|
| Select Drive for PC Card Reader | Select the letter of the drive to which the PC Card reader is attached. This field is a menu list of all drives that may be available on this PC. |
| Load Data | A button that when pressed starts the process of uploading the data from the PC Card into the database. |
| Clear Reconcile Data | A button that when pressed clears out any data that has already been uploaded into the database. It is a good idea to use this function before any PC Cards are uploaded. This ensures good data. |

FIG. 12b

Reconcile

| SKYTELLER | Cash Bag ID | Denomination | Count |
|---|---|---|---|
| PC Card | 12345 | 100 | 0 |
| | | 50 | 0 |
| Reconcile | Currency | 20 | 0 |
| | BRITISH POUND | 10 | 0 |
| Exit | | 5 | 0 |
| | Currency Counted | 2 | 0 |
| | | 1 | 0 |
| | Add Currency | TC | 0 |
| | Reset Counts | | |
| | | | 0.00 |

For Travelers Checks enter the total amount, not the count, of the checks.

*FIG. 13a*

| Fields | Purpose |
|---|---|
| Cash Bag ID | This is a pull-down menu of the cash bag serial numbers that were assigned to the POS Device during the Card Load process. |
| Currency | This is a pull-down menu of the codes of the currencies that are actually present in the cash bag as determined from the transaction data off the PC Card. |
| Denomination | A listing of all denominations for the selected currency. Coins are represented with a decimal (.01, .05, .10, etc.) |
| Count | For bank notes and coins, this is a simple quantity of all the notes of that denomination in the selected currency. For traveler's checks, the count is a total of the face values of the traveler's checks in the selected currency. |
| Currency Counted | A button that when pressed removes the currency from the currency pull down menu for the current cash bag as the currency has been counted and the appropriate values entered. |
| Add Currency | A button that when pressed allows the user to add additional currencies to the reconcile process for the selected cash bag. This could happen if the currency doesn't exist in the transactional data. Another pull down currency menu is brought onto the screen. The user then selects from this list the currency that needs to be added to the cash bag currency list. Currencies already in the list will not be an option for selection. |
| Reset Counts | A button that when pressed will reset the reconcile so all currencies already counted are re-displayed. The count information previously entered is retained. If an error is made during the count, this maybe necessary to use. |

*FIG. 13b*

Inventory Report (INV)

CURRENCY INVENTORY REPORT
End-of-Flight Reconciliation
Physical Counts

| Canadian Airlines | Flight No: | CP 03 | Flight Date: | 19/07/2000 |
|---|---|---|---|---|
| | Flight No: | CP 04 | Flight Date: | 20/07/2000 |

<u>CASH</u>

| Currency Name | Denomination | Quantity | Amount |
|---|---|---|---|
| CAD | .01 | 0 | 0.00 |
| | .05 | 0 | 0.00 |
| | .10 | 0 | 0.00 |
| | .25 | 0 | 0.00 |
| | 1 | 0 | 0.00 |
| | 2 | 0 | 0.00 |
| | 5 | 0 | 0.00 |
| | 10 | 0 | 0.00 |
| | 20 | 0 | 0.00 |
| | 50 | 0 | 0.00 |
| | 100 | 0 | 0.00 |
| | 1000 | 0 | 0.00 |
| | Total: | | 0.00 |
| GBP | 1 | 0 | 0.00 |
| | 2 | 0 | 0.00 |
| | 5 | 0 | 0.00 |
| | 10 | 0 | 0.00 |

*FIG. 15*

Flight Summary Report (SUM)

| FLIGHT SUMMARY REPORT | | | | | | | |
|---|---|---|---|---|---|---|---|
| Canadian Airlines | | | | | | | |
| Flight CP 03/CP 04 | | | | | | | |
| Origination Airport: | YVR | | | | | | |
| Destination Airport: | NRT | | | | | | |
| Arrival Date: | 08/08/2000 | | | | | | |

| | | Beginning Inventory | | Expected Ending Inventory | | Change in Inventory | |
|---|---|---|---|---|---|---|---|
| Currency | USD Spot Rate* | Amount | USD Equiv | Amount | USD Equiv | Amount Incr/decr | USD Equiv |
| CAD | 1.4795 | 2,600.00 | 1,757.34 | 3130.00 | 2115.57 | 530.00 | 358.23 |
| GBP | 0.6606 | 0.00 | 0.00 | 55.00 | 83.26 | 55.00 | 83.26 |
| JPY | 106.2128 | 200,000.00 | 1,883.01 | 64100.00 | 603.51 | (135,900.00) | (1,279.51) |
| USD | 1.0000 | 200.00 | 200.00 | 289.79 | 289.79 | 89.79 | 89.79 |
| | | | | | | Total: | (748.23) |

| Travelers Cheques | Currency | USD Spot Rate | Actual Amt | Expected Amt | USD Equiv |
|---|---|---|---|---|---|
| | CAD | 1.4795 | 0.00 | 520.00 | 351.47 |
| | JPY | 106.2128 | 0.00 | 11,000.00 | 103.57 |
| | USD | 1.0000 | 0.00 | 270.00 | 270.00 |
| | | | | Total: | 725.04 |

| Credit Cards | Currency | USD Spot Rate | Actual Amt | | USD Equiv |
|---|---|---|---|---|---|
| | CAD | 1.4795 | 358.11 | | 242.05 |
| | USD | 1.0000 | 96.07 | | 96.07 |
| | | | | Total: | 338.12 |

| Duty Free Liability | Currency | USD Spot Rate | Actual Amt | | USD Equiv |
|---|---|---|---|---|---|
| | CAD | 1.4795 | 316.00 | | (213.59) |
| | | | | Total: | (213.59) |
| | | | | Gross Profit: | 101.34 |

| Over/(Short) | Currency | USD Spot Rate | | Amount | USD Equiv |
|---|---|---|---|---|---|
| | CAD | 1.4795 | | (3,650.00) | (2,467.05) |
| | GBP | 0.6606 | | (55.00) | (83.26) |
| | JPY | 106.2128 | | (75,100.00) | (707.07) |
| | USD | 1.0000 | | (559.79) | (559.79) |
| | | | | Net Over/(Short): | (3,817.17) |
| | | | | Net Profit(Loss): | (3,715.83) |

*Spot rate to US Dollar on the day PC Card is downloaded.

FIG. 16

Credit Card Report (CCD)

```
Credit Card Transaction Report
Airline              Flight    Flight Date
Canadian Airline     CP 03     19/07/2000
                     CP 04     20/07/2000

Currency   Credit Card Type   CC Number          CC Expire Date    Total Charged
CAD        MASTERCARD         5334730680915400   01/2001                  151.41
           MASTERCARD         5334730680915400   01/2001                  131.00
           MASTERCARD         5334730680915400   01/2001                   75.70
                                                         Total:          358.11

USD        MASTERCARD         5334730680915400   01/2001                   96.07
                                                         Total:           96.07
```

*FIG. 17*

Transaction Detail Report (TRX)

Transaction Detail Report
Canadian Airlines       Flight No:  CP 03    Flight Date:  19/07/2000    PAX Load:  160
                        Flight No:  CP 04    Flight Date:  20/07/2000    PAX Load:    0

FX TRANSACTIONS

| Flt | Bag No. | TXN No. | Currency Sold | | | | Currency Received | | | | USD Profit |
|---|---|---|---|---|---|---|---|---|---|---|---|
| | | | Type | Amount | USD Equiv | Tender | Type | Amount | USD Equiv | |
| CP 03 | 12345 | 2 | JPY | 10,000.00 | 94.15 | BN | CAD | 200.00 | 135.18 | 7.91 |
| | | | | | | CH | CAD | -49.00 | -33.12 | |
| | 12345 | 3 | JPY | 10,000.00 | 94.15 | BN | GBP | 65.00 | 98.40 | 4.25 |
| | 12345 | 4 | JPY | 15,000.00 | 141.23 | CH | CAD | -73.00 | -49.34 | 12.20 |
| | | | | | | TC | CAD | 300.00 | 202.77 | |
| | 12345 | 5 | JPY | 10,000.00 | 94.15 | CH | CAD | -154.00 | -104.09 | 1.76 |
| | | | | | | TC | USD | 200.00 | 200.00 | |
| | 12345 | 6 | JPY | 10,000.00 | 94.15 | CC | CAD | 151.41 | 102.34 | 8.19 |
| | 12345 | 7 | JPY | 10,000.00 | 94.15 | CC | USD | 96.07 | 96.07 | 1.92 |
| | 12345 | 8 | JPY | 10,000.00 | 94.15 | BN | CAD | 71.00 | 47.99 | 7.91 |
| | | | | | | TC | CAD | 80.00 | 54.07 | |
| | 12345 | 9 | JPY | 10,000.00 | 94.15 | BN | USD | 56.00 | 56.00 | 1.85 |
| | | | | | | TC | USD | 40.00 | 40.00 | |
| | 12345 | 1 | JPY | 10,000.00 | 94.15 | BN | CAD | 151.00 | 102.06 | 7.91 |
| | 12345 | 10 | JPY | 10,000.00 | 94.15 | BN | CAD | 20.00 | 13.52 | 7.91 |
| | | | | | | CC | CAD | 131.00 | 88.54 | |
| | 12345 | 11 | JPY | 10,000.00 | 94.15 | BN | CAD | 200.00 | 135.18 | 10.90 |
| | | | | | | CH | JPY | -3,200.00 | -30.13 | |
| | 12345 | 12 | JPY | 6,600.00 | 62.14 | BN | CAD | 100.00 | 67.59 | 5.45 |
| | 12345 | 13 | JPY | 6,600.00 | 62.14 | BN | CAD | 100.00 | 67.59 | 5.45 |
| | 12345 | 14 | JPY | 4,500.00 | 42.37 | TC | JPY | 5,000.00 | 47.08 | 4.71 |
| | 12345 | 15 | JPY | 5,000.00 | 47.08 | CC | CAD | 75.70 | 51.17 | 4.09 |
| Flight Totals: | | 15 | | | 1,296.46 | | | | 1,388.87 | 92.41 |
| Grand Totals: | | 15 | | | 1,296.46 | | | | 1,388.87 | 92.41 |

DUTY FREE TRANSACTIONS

| Flt | Bag No. | No. of TXNs | Currency Sold | | | | Currency Received | | | | USD Profit |
|---|---|---|---|---|---|---|---|---|---|---|---|
| | | | Type | Amount | USD Equiv | Tender | Type | Amount | USD Equiv | |
| CP 03 | 12345 | 8 | CAD | 316.00 | 213.58 | BN | CAD | -36.00 | -24.33 | 8.94 |
| | | | | | | BN | GBP | -10.00 | -15.14 | |
| | | | | | | BN | JPY | 5,000.00 | 47.08 | |
| | | | | | | BN | USD | 33.79 | 33.79 | |
| | | | | | | TC | CAD | 140.00 | 94.63 | |
| | | | | | | TC | JPY | 6,000.00 | 56.49 | |
| | | | | | | TC | USD | 30.00 | 30.00 | |
| Flight Totals: | | | | | 213.58 | | | | 222.52 | 8.94 |
| Grand Totals: | | | | | 213.58 | | | | 222.52 | 8.94 |

Grand Total Profit:  101.35

*FIG. 18*

Over and Short (Exceptions) Report (XCP)

Reconcile Over/Short Report

Canadian Airlines     Flight No: CP 03     Flight Date: 19/07/2000
                              Flight No: CP 04     Flight Date: 20/07/2000

| Currency | Flight | Bag No. | Crew1 | Crew2 | | Expected | Actual | Over(Short) |
|---|---|---|---|---|---|---|---|---|
| CAD | CP 03 | 12345 | 988777 | 111223 | TC | 520.00 | 0.00 | (520.00) |
| | CP 04 | 98765 | No Crew | No Crew | TC | 0.00 | 0.00 | 0.00 |
| | | | | | Totals: | 520.00 | 0.00 | (520.00) |
| | | | | | USD Equiv: | | | (351.47) |
| | CP 03 | 12345 | 988777 | 111223 | BN | 630.00 | 0.00 | (630.00) |
| | CP 04 | 98765 | No Crew | No Crew | BN | 2,500.00 | 0.00 | (2,500.00) |
| | | | | | Totals: | 3,130.00 | 0.00 | (3,130.00) |
| | | | | | USD Equiv: | | | (2,115.58) |
| | | | | Currency Totals: | | 3,650.00 | 0.00 | (3,650.00) |
| | | | | | USD Equiv: | | | (2,467.05) |
| GBP | CP 03 | 12345 | 988777 | 111223 | TC | 0.00 | 0.00 | 0.00 |
| | | | | | Totals: | 0.00 | 0.00 | 0.00 |
| USD | CP 03 | 12345 | 988777 | 111223 | TC | 270.00 | 0.00 | (270.00) |
| | CP 04 | 98765 | No Crew | No Crew | TC | 0.00 | 0.00 | 0.00 |
| | | | | | Totals: | 270.00 | 0.00 | (270.00) |
| | | | | | USD Equiv: | | | (270.00) |
| | CP 03 | 12345 | 988777 | 111223 | BN | 89.79 | 0.00 | (89.79) |
| | CP 04 | 98765 | No Crew | No Crew | BN | 200.00 | 0.00 | (200.00) |
| | | | | | Totals: | 289.79 | 0.00 | (289.79) |
| | | | | | USD Equiv: | | | (289.79) |
| | | | | Currency Totals: | | 559.79 | 0.00 | (559.79) |
| | | | | | USD Equiv: | | | 0.00 |
| | CP 03 | 12345 | 988777 | 111223 | BN | 55.00 | 0.00 | (55.00) |
| | | | | | Totals: | 55.00 | 0.00 | (55.00) |
| | | | | | USD Equiv: | | | (83.26) |
| | | | | Currency Totals: | | 55.00 | 0.00 | (55.00) |
| | | | | | USD Equiv: | | | (83.26) |
| JPY | CP 03 | 12345 | 988777 | 111223 | TC | 11,000.00 | 0.00 | (11,000.00) |
| | | | | | Totals: | 11,000.00 | 0.00 | (11,000.00) |
| | | | | | USD Equiv: | | | (103.57) |
| | CP 03 | 12345 | 988777 | 111223 | BN | 64,100.00 | 0.00 | (64,100.00) |
| | | | | | Totals: | 64,100.00 | 0.00 | (64,100.00) |
| | | | | | USD Equiv: | | | (603.51) |
| | | | | Currency Totals: | | 75,100.00 | 0.00 | (75,100.00) |
| | | | | | USD Equiv: | | | (707.07) |

*FIG. 19*

Journal Text File (JRN)

History Text File (HIS)

Archive Text File (ARC)

*FIG. 22*

CONTROL SYSTEM AND METHOD FOR CURRENCY EXCHANGE AND MERCHANDISE SALES

BACKGROUND OF THE INVENTION

1. Field of the Invention

The present invention relates generally to the field of transactions, and in particular to a system and method for controlling currency exchange and merchandise sales on commercial airliners.

2. Description of the Prior Art

Passengers on commercial aircraft and other vehicles represent commercial opportunities for merchandise sales. For example, on international flights merchandise sales can often be made "duty-free". Duties assessed on various consumer goods can be substantial in a number of countries. Therefore, duty-free sales tend to be relatively popular among international travelers, particularly with relatively expensive, luxury-type items.

Duty-free merchandise inventories can be stowed in the service carts commonly used by airlines for in-flight food and beverage service. The service carts are stocked with merchandise, food and beverages by vendors and caterers at airports for loading on outbound flights. The flight attendants sell duty-free merchandise to passengers in much the same way as beverage sales are handled. Empty carts are offloaded for restocking. Service carts tend to be relatively uniform in size to facilitate stowing in standard-size airliner galleys and to facilitate passing through the aisles. They are subject to applicable regulations and certifications for airline use. For example, the Federal Aviation Administration (FAA) certifies equipment for use on airliners in the United States. Therefore, an important objective in utilizing service carts for currency exchange and merchandise sales is to avoid modifying the carts. Such modifications, even if allowed, could require FAA recertification.

Service carts on international flights have previously been utilized for currency exchange. For example, U.S. Pat. No. 6,003,008 and Des. 406,270, which are assigned to a common assignee herewith, disclose point-of-sale devices for mounting on top of airline service carts. Such devices receive currency and process transactions, including currency exchange and merchandise sales. However, more compact equipment is desirable to comply with airliner weight restrictions and size limitations.

Currency conversion represents another type of commercial opportunity among airline passengers. Relativity high percentages of international travelers convert currency. Although currency conversion transactions can be conducted in both the originating and destination countries, in-flight conversion tends to be considerably more convenient than the alternative of locating a financial institution before or after traveling. Moreover, in-flight currency exchange can accommodate passengers' needs for local currency for ground transportation and other needs on arrival.

Duty-free sales and foreign currency exchange provide revenue for airlines and other entities which receive portions of the profits generated by merchandise sales and foreign currency exchange. Although such transactions have a number of advantages for passengers, airlines and vendors, several difficulties are typically encountered in providing merchandise sales and currency exchange. For example, space limitations significantly restrict the types of merchandise which can be loaded into service carts. Therefore, the merchandise stocked in the service carts tends to be relativity small and high-value. Examples include watches, perfumes, liquor, cigarettes, electronics and other luxury-type items which are typically associated with relativity high duties.

Security and accountability for currency and merchandise are also concerns. They assume even greater significance when foreign currency exchange services are offered because the inventory must include additional cash of various denominations.

Other problems arise from multiple flight crews handling the service carts and the merchandise and currency stocked thereon. Since different flight crews are often involved in outbound, intermediate and return flights, responsibility for goods and currency must be transferred at different stations in route. Still further, currency inventory utilized for conversion and making change for merchandise sales represents assets which are tied up and at risk to the provider.

The present invention addresses the shortcomings of the prior art. Heretofore, there has not been available a system and method for controlling currency exchange and merchandise sales with the advantages and features of the present invention.

SUMMARY OF THE INVENTION

In the practice of the present invention, a system is provided for controlling currency exchange and merchandise sales aboard commercial airline flights. The system includes a point-of-sale (POS) computer which is carried on board the aircraft for use by air crew members in conducting currency exchange and merchandise sales transactions. Inventory and transactional data are transferred preflight and post-flight between the POS computer and a cash/currency processing computer (CPC) located remotely from the aircraft. The control system is particularly adapted for use in conjunction with airline service carts stocked with merchandise and mounting security drawers for currency. In the practice of the method of the present invention, currency and merchandise are inventoried preflight by the CPC computer, data therefrom is loaded into the POS computer, currency exchange and merchandise sales transactions are recorded by the POS computer in-flight, reports are generated by the POS computer post-flight and the CPC computer receives flight-related data from the POS computer. Transaction and ending inventory reports are generated post-flight for reconciling with preflight reports. Additional reports are generated for documenting profits and losses, currency exchange and merchandise sales historical data and discrepancies between beginning and ending inventory balances.

OBJECTS AND ADVANTAGES OF THE INVENTION

The principal objects and advantages of the present invention include: providing a system for controlling currency exchange and merchandise sales; providing such a system which is adapted for use on board commercial airline flights; providing such a system which utilizes existing airline service carts for stocking merchandise and currency inventories; providing such a system which utilizes a touch-screen, point-of-sale (POS) computer on board the aircraft for recording inventories preflight and transactions in-flight; providing such a system which utilizes a cash/currency processing computer (CPC) located remotely from the aircraft for transferring data to and from the POS computer; providing such a system which is secure; providing such a system which is relatively easy to operate; providing such a system which utilizes readily available equipment; providing such a system which utilizes existing airline service carts without modifying same; providing a method of controlling currency exchange and merchandise sales; providing such a method which reduces the risk of currency or merchandise loss; providing such a method which performs preflight inventory functions; providing such a method which records transactions in-flight; and providing such a method which generates reports and reconciles beginning and ending inventories post-flight.

BRIEF DESCRIPTION OF THE DRAWINGS

FIGS. 4a–22 are screen displays and documentation of the control system and method.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
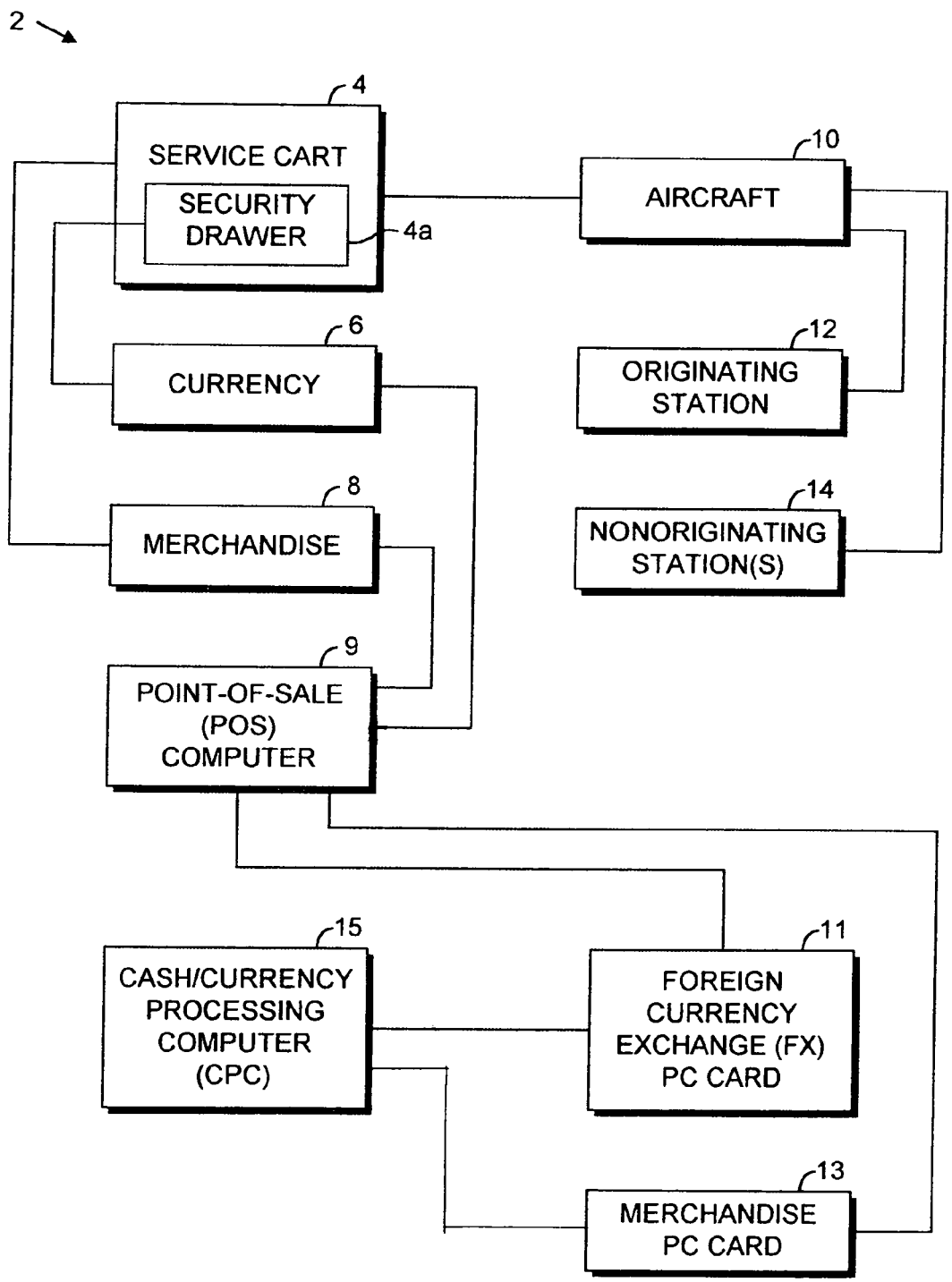
FIG. 1 is a block diagram of a system for controlling currency exchange and merchandise sales embodying the present invention.
Figure 1A:
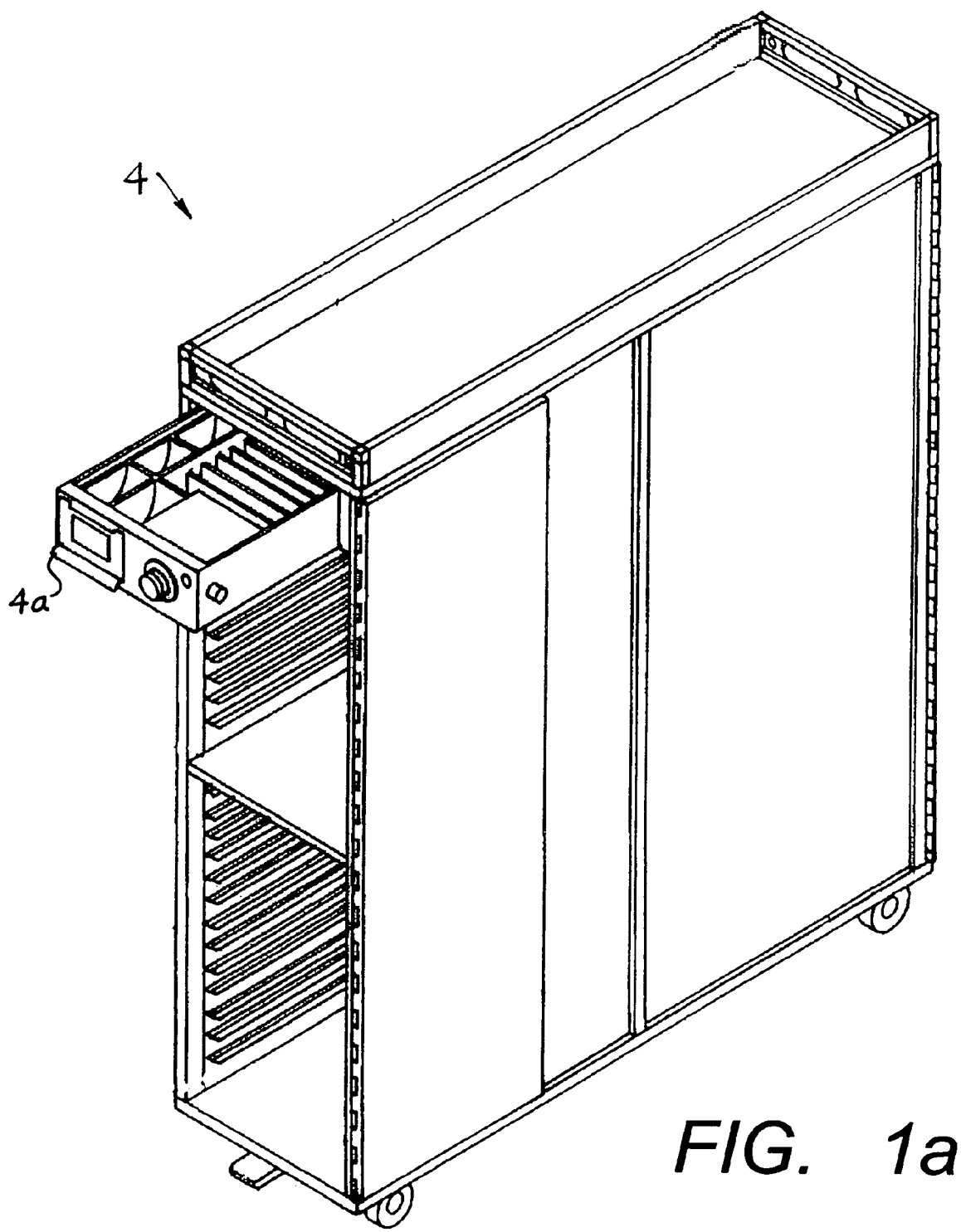
FIG. 1a is an upper, perspective view of a service cart with a security drawer for use with the control system of the present invention.

Referring to the drawings in more detail, the reference numeral 2 generally designates a foreign currency exchange (FX) and merchandise sales system (FIG. 1). The system 2 generally includes a service cart 4 with a locking security drawer 4a (FIG. 1A) for receiving currency 6 and merchandise 8. The security drawer 4a is the subject of copending U.S. patent application Ser. No. 09/652,086, which is assigned to a common assignee herewith and is incorporated herein by reference.

Without limitation on the generality of useful applications of the control system 2 and the control method, an application in a commercial airliner 10 is shown and described. The aircraft 10 operates out of originating and nonoriginating stations 12, 14 respectively. A point-of-sale (POS) computer 9 is utilized on the aircraft 10 for recording the transactions involving the currency 6 and the merchandise 8. Without limitation on the generality of suitable computing devices, hand-held, touch-screen computers available from Touch-Star Technologies, LLC of Tulsa, Oklahoma. Suitable programming is available from Novo ivc of Warwickshire, England. Data from the POS computer 9 is stored on an FX PC card 11 and a merchandise PC card 13 for transfer to a cash/currency processing computer (CPC) 15 which can be located remote from the aircraft and airports.

II. Method for Currency Exchange and Merchandise Sales

Figure 2:
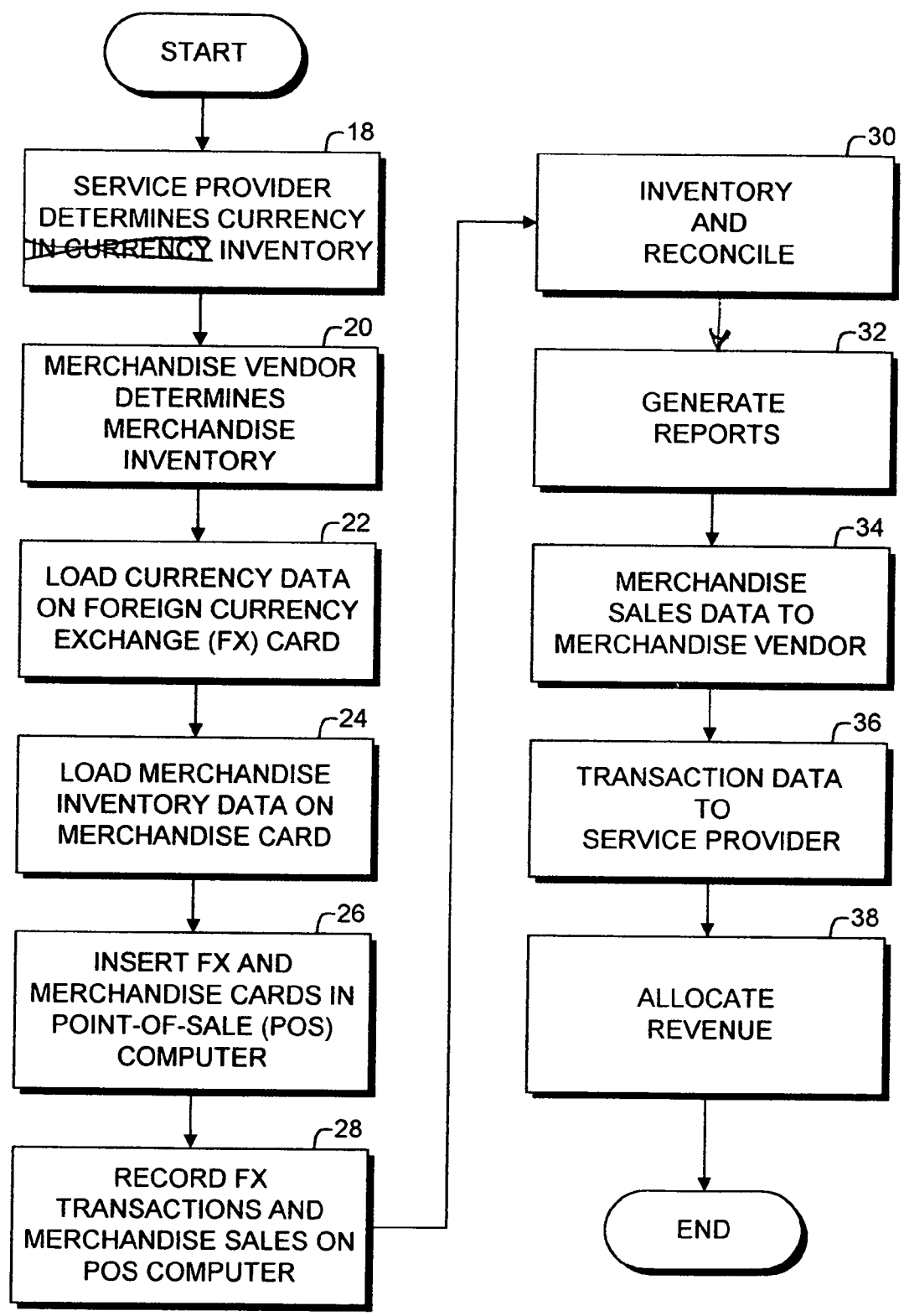
FIG. 2 is a flowchart of a method for controlling currency exchange and merchandise sales embodying the present invention.

FIG. 2 is a flowchart of the method of the present invention. A service provider determines the currency inventory at 18 based on such factors as the origin and destination of the flight, aircraft type, passenger load, historical sales penetration, average historical transaction amounts, input from air crews, time of flight and business/pleasure passenger mix.

The merchandise vendor determines the merchandise inventory at 20, which generally consists of relatively expensive, small goods likely to appeal to international travelers. Size restrictions imposed by the service carts 4 significantly affect the merchandise inventory. Currency data is loaded on the FX PC card 11 at 22 and merchandise inventory data is loaded on the merchandise PC card 13 at 24. The FX and merchandise cards 11, 13 are inserted in the POS computer 9 at 26. One or both of the FX and merchandise cards 11, 13 can be utilized depending on the availability of FX or merchandise sales or both on a particular flight.

FX and merchandise sales transactions are recorded on the POS computer 9 at 28. The POS computer 9 identifies the inventory and reconciles the transactions at the end of the flight at 30 and generates appropriate reports at 32. The merchandise sales data is provided to the merchandise vendor at 34 and the service provider receives transaction data (i.e., both FX and merchandise sales transactions) at 36. Revenues are allocated among the airline, service provider and merchandise vendor at 38.

III. In-Flight Technical Documentation

Figure 3:
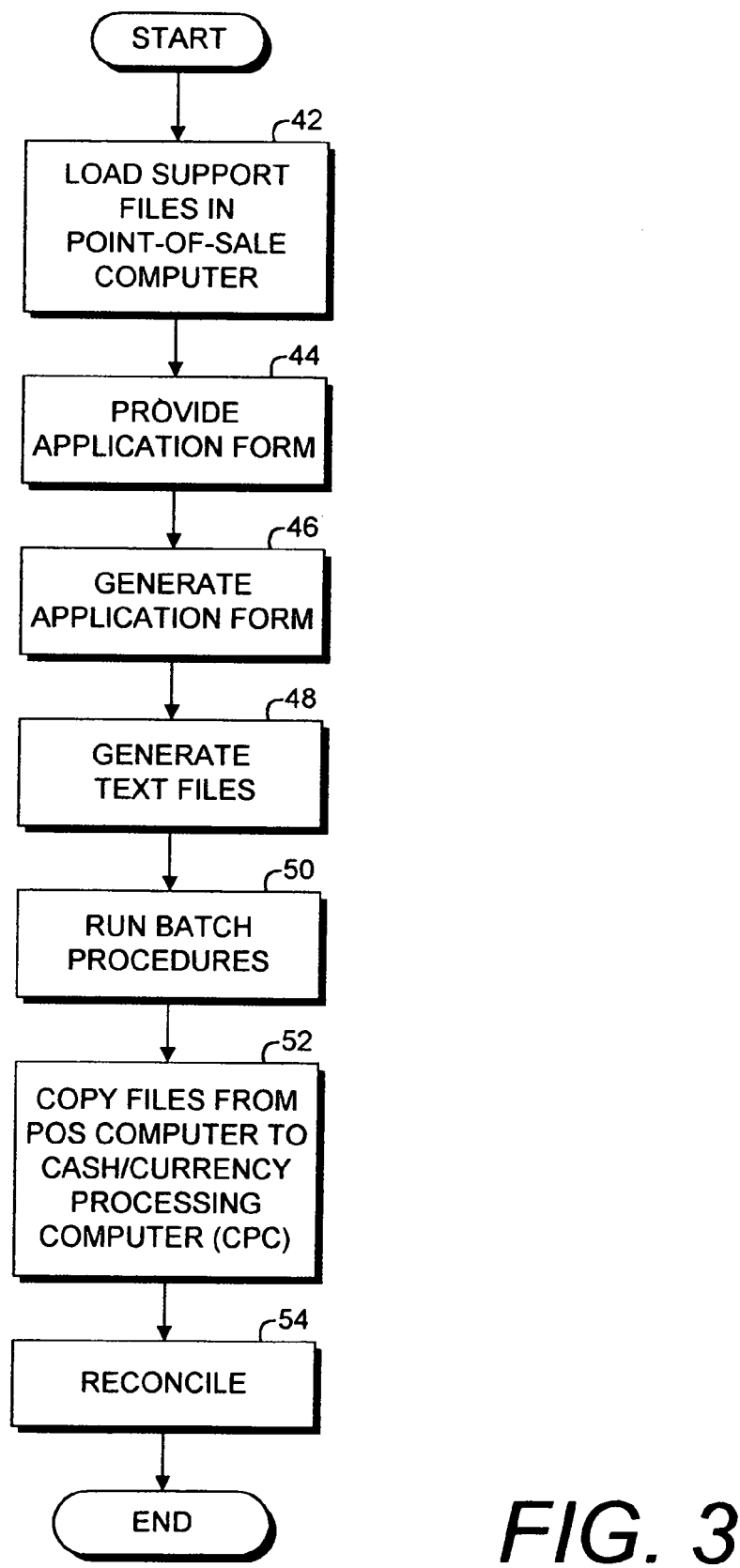
FIG. 3 is a flowchart of a procedure for in-flight technical documentation of currency exchange and merchandise sales transactions.

FIG. 3 shows a procedure for in-flight technical documentation of the method of the present invention. Support files are loaded in the POS computer 9 at 42. Application forms are loaded at 44 and can include a card load form allowing a user to enter information needed to load the POS PC cards 11, 13; a form reading data from the POS PC card 11 for reconciling currencies from the flight and a history form for producing a listing of all transactions.

Application reports are generated at 46 and include a flight summary report, a listing of currencies returned from a flight, a listing of credit card transactions that occurred during the flight, a listing of all currencies expected and actual amounts, a listing of transactions from the flight, a listing of rates for currencies being sold and tendered and history reports. Text files are generated at 48 and include an archive comprising a complete copy of the data used to reconcile flight, a journal consisting of entries to be entered into the system and a history file with a transaction listing used for historical and/or marketing purposes.

Batch procedures are run at 50 and include creating rate files to be sent to all CPC's, loading historical transaction data and a data extraction section. Files are copied from the POS computer 9 at 52 and are transmitted to the CPC 15 for processing. Reconciliation occurs at 54.

IV. In-Flight User Documentation

FIG. 4a shows a Main Screen for loading necessary data such as currencies, currency spot rates, currency pricing and beginning inventories of currencies packed in the security drawer 4a and onto a PC card 11 or 13. When the data is transferred to the PC card 11 or 13, the card loading process is complete and the cash bag data is deleted from the database, which is thereby readied for a new flight. The card load form also allows users to input and maintain information on airlines' flight schedules, currencies, currency spot rates and currency pricing. FIG. 4b shows the toolbar functions therefor.

FIG. 5a shows an Airlines Screen which allows the user to enter and maintain identifying information about the airlines which utilize the FX and merchandise sales services. The user can enter new records, update existing records or delete existing records. Upon entry to the screen, existing airlines' data is populated automatically. FIG. 5b shows the information managed by the Airlines Screen.

FIG. 6a shows a Flight Screen used to enter information about the flights on which the service provider will be providing FX services. The user enters flight numbers, origination airports and destination airports. The records can be entered and existing records updated or deleted from this screen, whereupon existing flights' data is populated automatically. Cash bag data being loaded onto a PC card 11 or 13 must be finished or reset through the Cash Bag Screen before deleting a flight. FIG. 6b shows the information managed by the Flight Screen.

FIG. 7a shows a Currency Screen which allows a user to enter information about the currencies and crew discount currencies for which the service provider offers FX services. The information entered will be used in building the files used by the POS computer 9 to perform the FX and the merchandise sales transactions. Crew currencies for providing air crew members with a discount are also entered in this screen, with the crew currencies being distinguished from the "real" (i.e., nondiscounted) currencies by a character (e.g., "Z") at the beginning of the currency code. The information managed by the Currency Screen is shown in FIG. 7b.

FIG. 8a shows a Rates Screen for entering and retaining current spot rates for each of various currencies. Crew currencies, if applicable, can also be entered and maintained on this screen. Rate information is in a "per dollar" format and can be entered periodically, e.g., daily. FIG. 8b shows the information managed by this screen.

FIG. 9a shows a Pricing Screen allowing a user to enter and maintain transaction fees, par fees and spreads for each currency that is applied to an FX or merchandise sales transaction. The information is maintained according to flight origin and destination, and generally will not change on a frequent basis. If applicable, crew currencies can also be maintained on this screen. FIG. 9b shows information managed by this screen.

FIG. 10a shows a Cash Bag Screen for entering currency inventories that will be loaded onto a flight for a single POS computer 9. A specific set of files containing data is loaded onto a PC card 11 or 13 prior to the flight. Data entered on the screen is used to build the required files on the PC card 11 or 13. FIG. 10b shows the information managed by this screen.

FIG. 11a shows a Validate Screen for performing a final check on information entered from the Cash Bag Screen. The cash information for each individual flight can be viewed. Dates, currencies and start totals can be modified if they were originally entered in the Cash Bag Screen. A Bart Report (FIGS. 14a,b, discussed below) is run for the use of the flight crew to load rate information. The user is given the option of loading the data on a duplicate, backup PC card. FIG. 11b shows the information managed by this screen.

FIG. 12a shows a PC Card screen. The PC Card screen is used to upload the data from a PC card 11 or 13 into the local database. FIG. 12b shows the fields displayed in the PC Card screen.

FIG. 13a shows a Reconcile Screen which allows the user to enter quantities of each denomination of a currency being counted after it has returned to the originating station 12 and been uploaded into the CPC 15 database for reconciling currency amounts removed from the aircraft at the end of the flight, based on beginning currency amounts and all in-flight transactions. Reconciliation is performed for all POS computers 9 and all cash bags on a particular round trip. FIG. 13b shows the fields displayed by the Reconcile Screen.

Figure 14A:
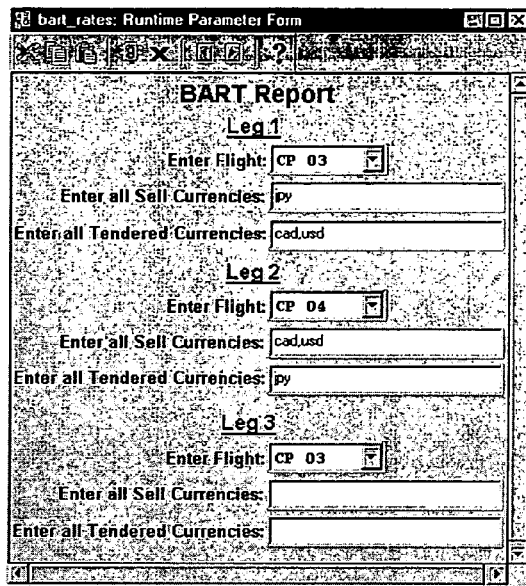
Figure 14B:
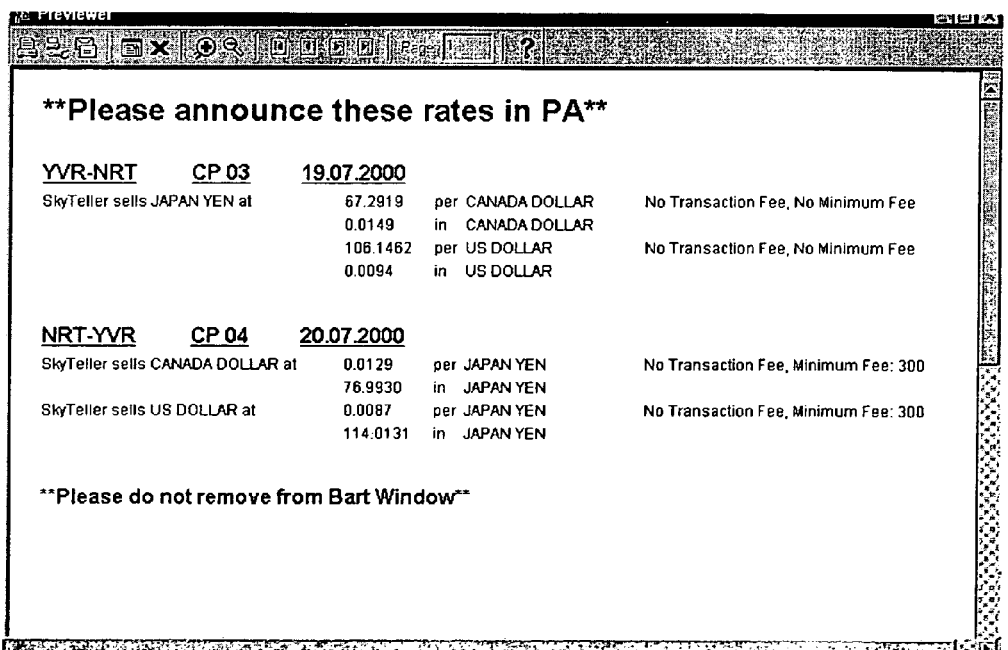

FIG. 14a shows a Bart Report displaying currencies that are going to be sold at a rate against the currencies that are going to be tendered for a particular flight. This information is used by flight attendants to announce what the rates are for the currencies that are going to be sold in-flight. FIG. 14b shows rate information for announcing by a flight attendant.

FIG. 15 shows an Inventory Report (INV) listing the currencies that were counted and the total number of notes in each denomination for logging the currencies back into the inventory system.

FIG. 16 shows a Flight Summary Report (SUM). The Flight Summary Report is a general summary of currencies exchanged during the flight including separate line items for each currency's transactions of FX merchandise sales, travelers' checks and credit cards. Net gain or loss is calculated and displayed. Crew currency is added into the base currency.

FIG. 17 shows a Credit Card Report (CCD) listing all credit card transactions used to purchase currency on a particular flight.

FIG. 18 shows a Transaction Detail Report (TRX) with a list of all FX and are calculated along with profit, which corresponds to the Flight Summary Report.

FIG. 19 is an Over and Short (Exceptions) Report (XCP) displaying what was expected and what was actually received for each currency on the trip. Separate breakdowns are provided for currency, bank notes and travelers' checks.

Figure 20:
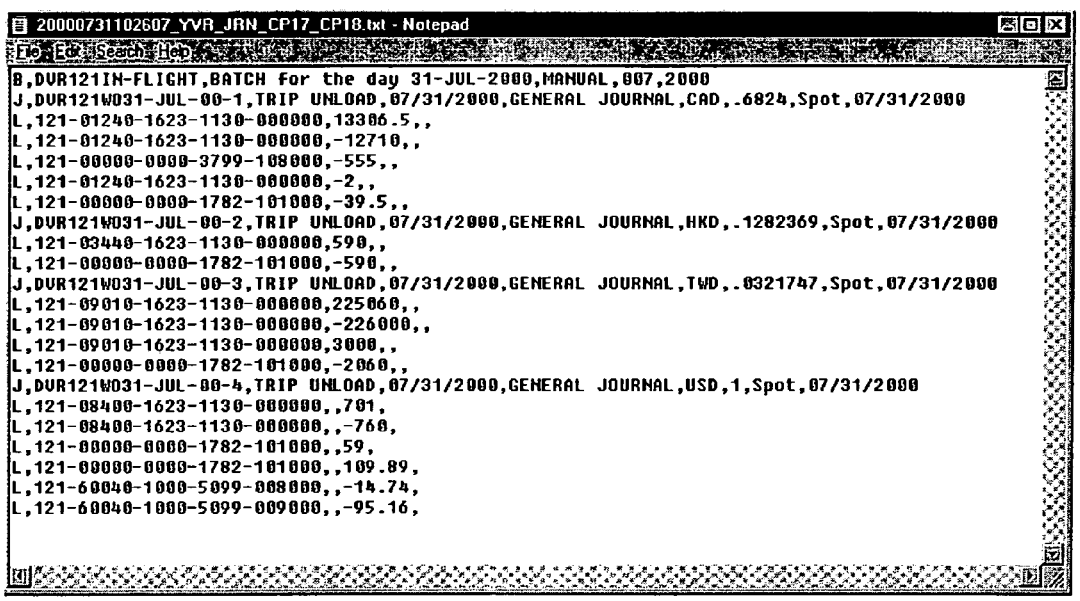

FIG. 20 is a Journal Text File (JRN) with information for a round-trip for feeding into the service provider's accounting system.

Figure 21:
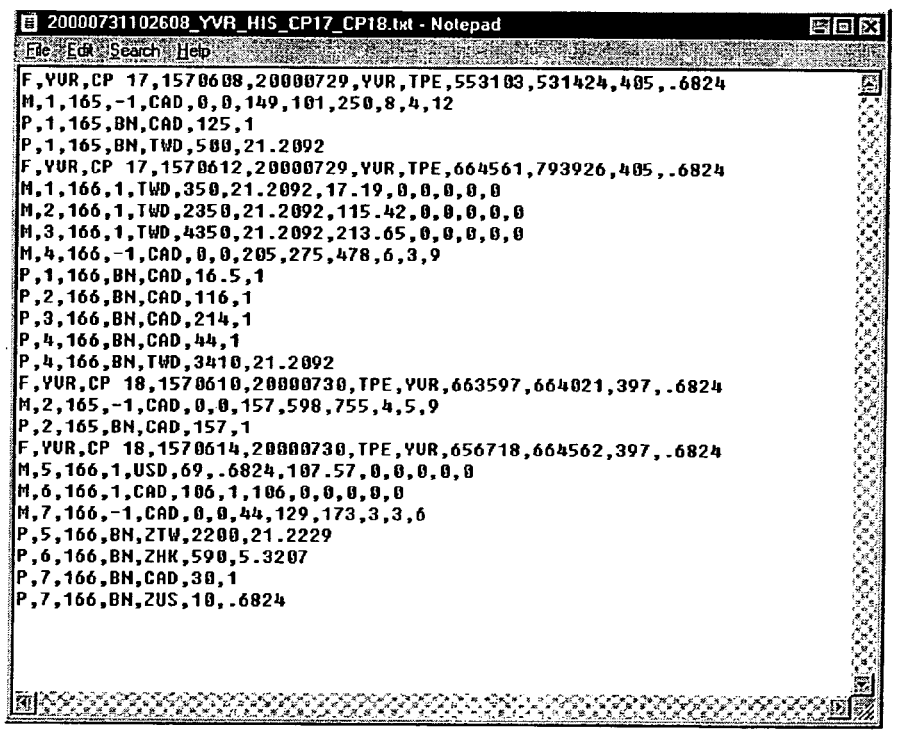

FIG. 21 is a History Text File (HIS) which contains flight and transaction-level data formatted in a specific manner for loading the history database for the history application.

FIG. 22 is an Archive Text File (ARC) which contains all transaction details uploaded from the PC card(s) 11 or 13 for a particular round trip.

It is to be understood that while certain forms of the present invention have been illustrated and described herein, it is not be limited to the specific forms or arrangement of parts described and shown.

What is claimed is:

1. A system for controlling currency exchange and merchandise sales on an aircraft with a passenger load, which comprises:
   a) a service cart;
   b) a security drawer assembly removably mounted in the service cart, wherein the security drawer assembly includes:
      a body having a sleeve with an open end and a passage open at said end;
      a body-mounting mechanism connected with said body for removably mounting the body within the service cart; and
      a security drawer movably mounted in the sleeve, the security drawer having, when the security drawer assembly is mounted in the service cart:
         a locked, closed position such that the body cannot be removed from the service cart when the security drawer is in the locked, closed position; and
         an unlocked, open position such that an interior of the security drawer may be accessed when the security drawer is in the unlocked, open position;

c) a currency inventory including at least two different currencies stored in the interior of said security drawer such that the currency inventory may be accessed when the security drawer is in the unlocked, open position;
d) an inventory of merchandise stowed in the service cart;
e) the service cart being stowable on the aircraft and movable through the cabin thereof;
f) a point-of-sale computer receiving currency and merchandise inventory data; and
g) said point-of-sale computer being operable by a flight attendant to record transactions with said merchandise and said currency.

2. The system according to claim 1, which includes:
a) a processing computer adapted to receive transactional data from said point-of- sale computer.

3. The system according to claim 2, which includes:
a) a data card adapted to receive inventory data from said processing computer and transferring same to said point-of-sale computer.

4. The system according to claim 3, which includes:
a) said data card comprising a currency data card; and
b) a merchandise data card adapted to receive data pertaining to said merchandise inventory and transferring same to said point-of-sale computer.

5. The system according to claim 4, which includes:
a) said point-of-sale computer recording currency exchange and merchandise sales transaction data on said currency and merchandise data cards respectively for transferring same to said processing computer.

6. A method of controlling currency exchange and merchandise sales on a passenger flight with a service cart located in the aircraft cabin, which comprises the steps of:
a) providing a removable security drawer assembly in said service cart, wherein the security drawer assembly includes:
    a body having a sleeve with an open end and a passage open at said end;
    a body-mounting mechanism connected with said body for removably mounting the body within the service cart; and
    a security drawer movably mounted in the sleeve, the security drawer having, when the security drawer assembly is mounted in the service cart:
        a locked, closed position in said service cart such that the body cannot be removed from the service cart when the security drawer is in the locked, closed position; and
        an unlocked, open position such that an interior of the security drawer may be accessed when the security drawer is in the unlocked, open position;
b) providing an inventory of currency in the interior of said security drawer such that the currency inventory may be accessed when the security drawer is in the unlocked, open position;
c) providing an inventory of merchandise in said service cart;
d) providing a point-of-sale computer; and
e) loading said point-of-sale computer with data corresponding to said currency inventory and said merchandise inventory.

7. The method according to claim 6, which includes the additional step of:
a) determining a pre-flight currency inventory based on historical currency transaction data from previous flights.

8. The method according to claim 6, which includes the additional step of:
a) determining a pre-flight merchandise inventory for the service cart based on historical merchandise sales data.

9. The method according to claim 7, which includes the additional steps of:
a) loading currency inventory data on a data card pre-flight with a cash/currency processing computer;
b) installing said card in said point-of-sale computer; and
c) downloading data from said data card to said point-of-sale computer.

10. The method according to claim 6, which includes the additional steps of:
a) recording currency exchange and merchandise sales transactions on said point-of-sale computer in-flight;
b) inventorying said currency and merchandise inventories post-flight;
c) reconciling the post-flight currency and merchandise inventories with the currency and merchandise data on the point-of-sale computer; and
d) generating an end-of-flight report of currency and merchandise transactions during said flight.

11. The method according to claim 6, which includes the additional steps of:
a) maintaining foreign currency exchange information for multiple airlines;
b) programming said point-of-sale computer with foreign currency exchange information specific to a particular airline.

12. The method according to claim 6, which includes the additional steps of:
a) maintaining foreign currency exchange information for multiple airline flights; and
b) programming said point-of-sale computer with foreign currency exchange information specific to a particular flight.

13. The method according to claim 6, which includes the additional steps of:
a) maintaining multiple foreign currency exchange rates; and
b) programming said point-of-sale computer with said foreign currency exchange rates.

14. The method according to claim 13, which include the additional steps of:
a) maintaining flight crew foreign currency exchange discount rates; and
b) programming said point-of-sale computer with said flight crew foreign currency exchange discount rates.

15. The method according to claim 6, which includes the additional steps of:
a) maintaining information specific to a cash bag for a particular flight; and
b) transferring to a currency data card data pertaining to said cash bag for transfer to said point-of-sale computer.

16. The method according to claim 6, which includes the additional steps of;
a) providing the flight crew with currency exchange rate information; and
b) the flight crew announcing to the passengers the currency exchange rate information.

17. The method according to claim 15, which includes the additional step of;
a) reconciling end-of-flight contents of the cash bag with the processing computer.

18. The method according to claim 6, which includes the additional steps of;

a) conducting a physical inventory of the currency in the security drawer and the merchandise in the cart;
b) reconciling the physical inventory with currency exchange and merchandise sales transactions recorded by said point-of-sale computer.

19. The method according to claim 6, which includes the additional step of providing a flight summary report identifying currency, travelers' check and credit card transactions.

20. The method according to claim 6, which includes the additional steps of:
a) providing a transaction detail report of currency exchange transactions; and
b) providing a transaction detail report of merchandise sales transactions.

21. The method according to claim 20, wherein said merchandise comprises duty-free merchandise.

22. The method according to claim 6, which includes the additional step of providing an over and short (exceptions) report of overages and shortages with respect to said remaining currency and merchandise inventories.

23. The method according to claim 6, which includes the additional step of creating a transactional history file of said currency exchange and merchandise sale transactions.

24. The method according to claim 6, which includes the additional step of creating an archive file of data from currency exchange and merchandise sales transactions.

* * * * *